Feb. 27, 1968   R. P. KOZIARA   3,370,417
LOAD ACCELERATED TURBOCHARGER
Filed Jan. 12, 1966   2 Sheets-Sheet 1
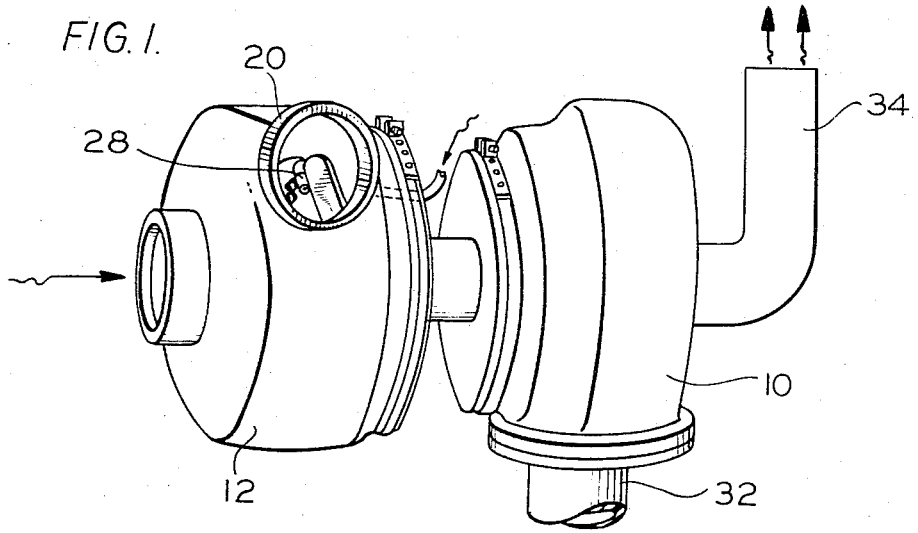
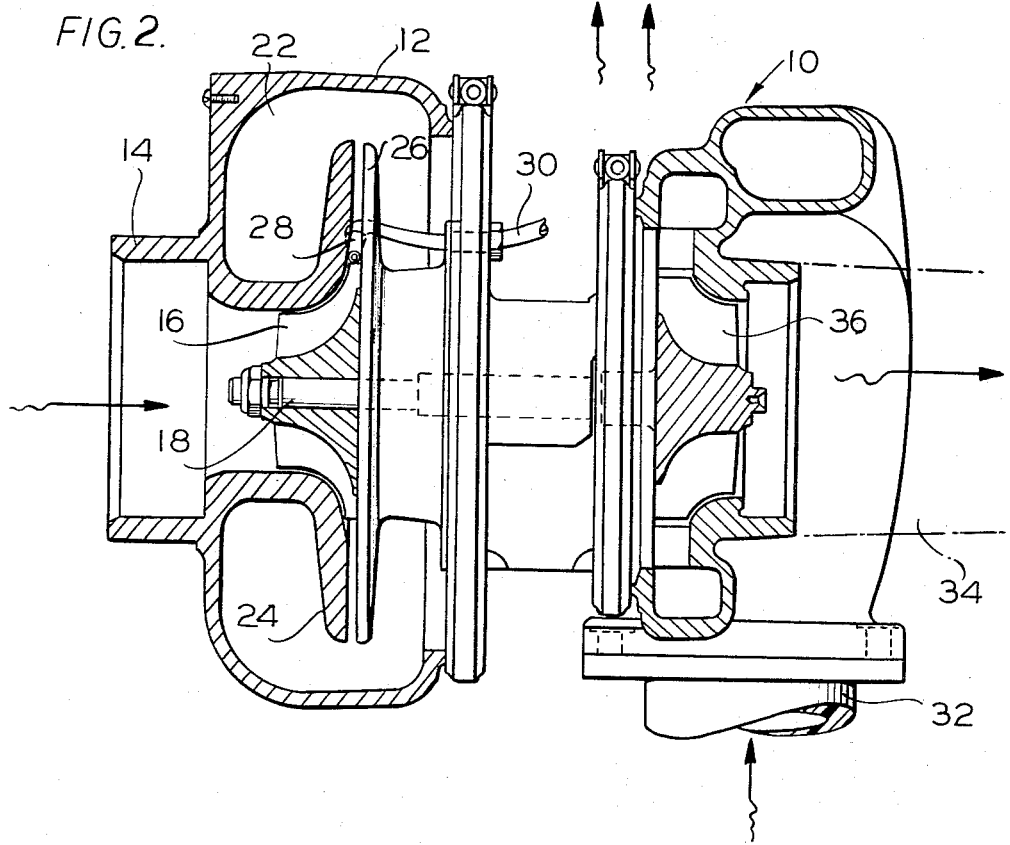
INVENTOR
ROBERT P. KOZIARA
John W. Gaines
ATT'Y Feb. 27, 1968          R. P. KOZIARA          3,370,417
LOAD ACCELERATED TURBOCHARGER
Filed Jan. 12, 1966          2 Sheets-Sheet 2
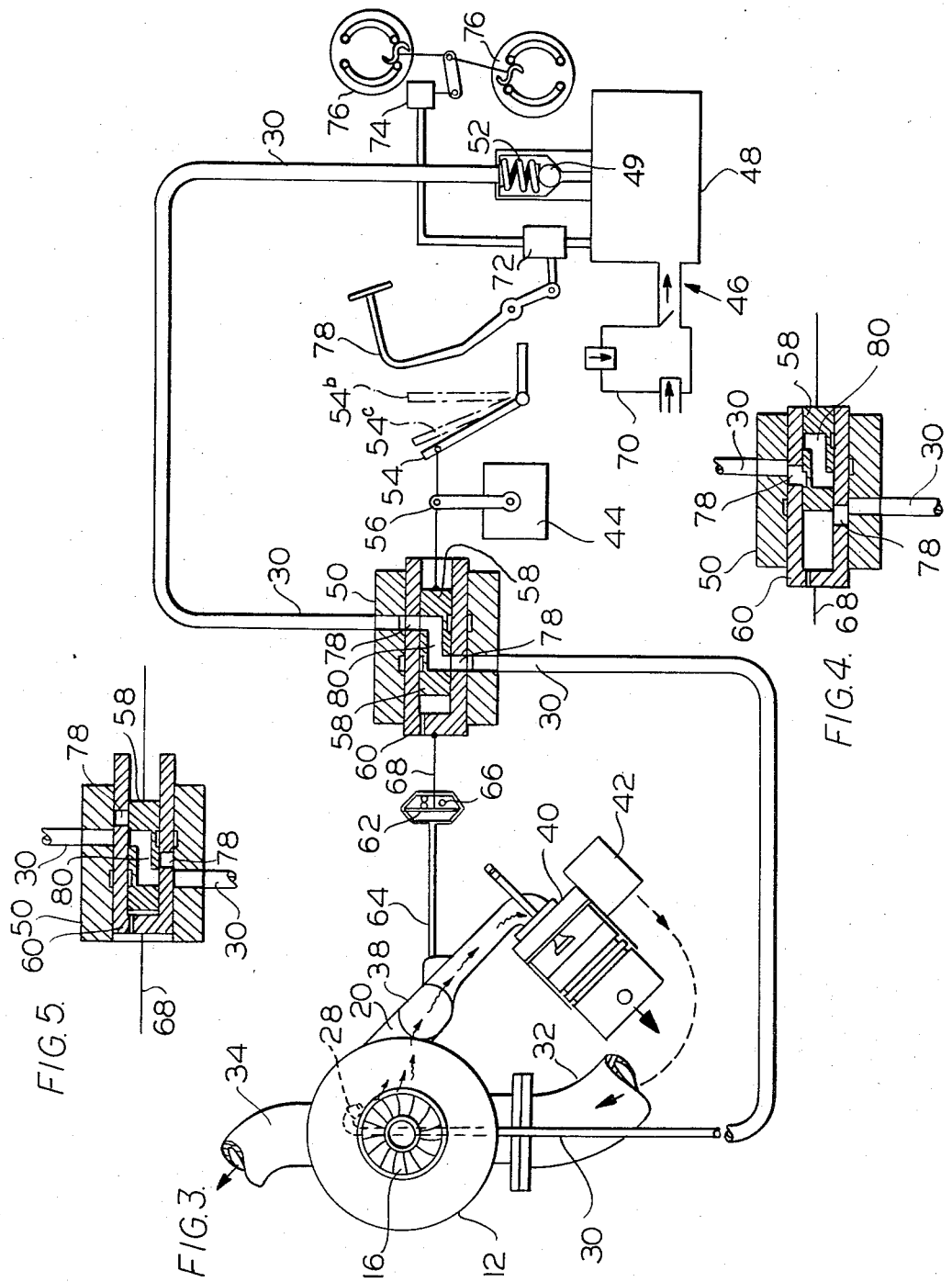
INVENTOR
ROBERT P. KOZIARA
John W. Gaines
ATT'Y

United States Patent Office 3,370,417
Patented Feb. 27, 1968

3,370,417
LOAD ACCELERATED TURBOCHARGER
Robert P. Koziara, Arlington Heights, Ill., assignor to International Harvester Company, a corporation of Delaware
Filed Jan. 12, 1966, Ser. No. 520,170
12 Claims. (Cl. 60—13)

ABSTRACT OF THE DISCLOSURE

Load accelerated turbosupercharger, normally operably driven by exhaust products from an engine to enable an air-supercharging rotor in the turbosupercharger to supply supercharged air to said engine, and being augmentatively driven at times with air injection under primary control of the accelerator pedal of said engine. Air injecting means for the purpose is operatively disposed relative to the rotor to apply a jet of compressed air to augment the acceleration of the rotor, generally at low speeds, and whenever either the accelerator pedal has a setting calling for rapid acceleration, or takes an appropriate pedal setting in sudden reaction to peak power demands on the engine.

---

The present application relates to a load accelerated turbosupercharger for supercharging an engine, e.g., a motor vehicle engine. More particularly, it relates to augmenting means to bring the turbosupercharger compressor speed and compressor pressure rapidly to a supercharging level, and effective to do so in response to conditions of either high acceleration of the engine or the imposition of a sudden peak power demand thereon, i.e., the loading condition accelerates the turbosupercharger.

The turbosupercharger, or turbocharger, is a turbine driven compressor unit. The turbine is driven by the exhaust gases coming from an engine, usually an internal combustion engine. In many cases where the following discussed problems arise, but not always, the engine is a diesel engine.

One problem in a vehicle engine that is turbocharged, particularly the diesel, is that quick acceleration or loading of the engine, or both, create a smokey exhaust. The reason is the lag of a compressor pressure build-up appropriate to the power demand and fuel system setting, and the result is that the mixture burned in the cylinders is overrich.

A second problem, related to and contributing to the first one, is that when the vehicle operator requires added power from the engine over a period of time, he is confronted with the ensuing lag during which the usual compressor accelerates and builds up to a level of supercharging pressure sufficient to burn the larger quantity of fuel available in the cylinders. The time lag for the compressor pressure build-up becomes particularly objectionable in case the operator requires such power boost from the engine in a short period. In that case, the operator makes an immediate, excessive demand by depressing the vehicle accelerator pedal to the wide open position, causing enriched fuel mixture and a smoking engine.

The compressor, according to my invention, is supplied with compressed air from an auxiliary source, which air is temporarily introduced internally in one or more jets in the general direction of the turbocharger compressor outlet and in a line directly against the outer tip portions of the compressor blades. The engine and turbocharger inevitably accelerate at a rapid rate, with each helping the other and with both being vitally assisted by the auxiliary source of air.

In particular first, the compressor, and hence the turbocharger as a unit, are accelerated because the jet or jets of augmenting air give a kick to the tip portion of each compressor blade as it comes into line. Second, the engine is accelerated because the volume of augmenting compressed air is at the same time making up the air deficiency and creating an immediate build-up of the supercharging pressure toward the desired excess of air for complete combustion. Third, the accelerating engine produces accelerated flow of engine combustion products to the turbine of the turbocharger, thereby accelerating the turbocharger.

It can thus be appreciated that both of the problems named are materially reduced or substantially eliminated, because the power build-up has a shortened period of time lag, and nevertheless throughout such short period an amount of augmenting air is continually present to provide, or to tend toward, complete combustion. In the desired way, an excess of smoke is eliminated and the engine in the vehicle will perform well when subjected to rapid acceleration and/or suddenly applied loads.

While in the ensuing discussion, the invention is described primarily for use in, and is shown embodied in, a diesel engine, it is evident that my invention has equal application to, and obvious advantages when used with, Otto cycle engines such as gas, gasoline, oil, and generally, spark ignition engines.

Various features, objects, and advantages will either be specifically pointed out or become apparent when, for a better understanding of the invention, reference is made to the following description taken in conjunction with the accompanying drawings, which show a preferred embodiment thereof and in which:

FIGURES 1 and 2 are respective isometric and longitudinal sectional views of a turbocharger unit embodying the present invention;

FIGURE 3 is a control diagram showing the turbocharger schematically included in an engine powered automotive vehicle; and FIGURES 4 and 5 show a valve detail of FIGURE 3, but with the valve in other positions.

More particularly in FIGURES 1 and 2 of the drawings a bipartite turbocharger is shown having a turbine 10, and a radial flow compressor 12 which is driven by the turbine. Atmospheric air is drawn into an inlet 14 of the compressor and flows axially and radially outwardly along the moving blades 16 of a compressor rotor which is fixed to a driven shaft 18. A cover or scroll collects the uncombusted, compressed air which is discharged through a tangential scroll outlet 20.

In entering the outer chamber 22 of the scroll, the air passes through a flat, disk shaped annular passing defined by a stator housing 24 and a fixed, radially disposed compressor backplate 26. A nozzle 28 in the disk shaped passage discharges a jet of compressed air against the tip portions of the blades 16, the axis of the nozzle being generally aligned with the scroll outlet 20. A compressed air line 30, hereinafter described, leads internally of the scroll of the compressor and is connected to the nozzle 28.

The turbine has an inlet connected to a waste gas line 32 and an outlet 34, both of which carry the waste gas products from an internal combustion engine. A turbine rotor, of the inflow type, carries blading 36 on a turbine rotor which is on the driving end of the driven shaft 18.

In FIGURE 3, the turbocharger is shown with the compressor 12 thereof connected by its outlet 20, to the intake manifold 38 of V-8 diesel engine 40. The engine 40 has an exhaust manifold 42 connected by the waste gas line 32 to the inlet of the turbine, not shown.

The engine 40 is part of a vehicle having an engine fuel system 44 and a braking system 46 including a source of compressed uncombusted air 48.

The compressed air line 30 to the nozzle 28 in the turbocharger leads in a path thereto including the source 48, a spring loaded valve 49, and a bipartite, air line valve 50. The spring loaded valve 49 is on the source 48 and unseats in the direction of the compressed air line 30 so as to supply air thereto only as long as pressure in the source 48 remains above a minimum value. At and below that value, a spring 52 in the valve closes the valve and the air line 30 so that the braking system is insured the minimum braking pressure at all times for safety's sake.

The vehicle has an accelerator pedal 54 which is connected to an injection pump control lever 56 provided on the fuel system 44 and which is also connected to an inner piston 58 that is slidably mounted in the valve 50. A hollow outer piston 60 is slidably received in the valve 50 and supports the inner piston 58.

A pneumatic capsule that automatically positions the outer piston 60 includes a transverse diaphragm 62 which is pneumatically connected at one side, by means of a pressure tube 64, to the intake manifold 38 of the engine 40. An opposing spring 66 presses on the opposite side of the diaphragm 62, which is connected by a mechanical connection 68 to the outer piston 60. The outer piston 60 conditions the valve 50, whenever the compressor speed and output pressure are low, so that the driver can have rapid acceleration at will.

The braking system of the vehicle 46 is conventional and therefore is shown mostly schematically. An air compressor 70 driven by the engine 40 keeps the source 48 under pressure. A brake valve 72 is connected to a power brake cylinder 74 so as to supply it with air from the source 48 and actuate the vehicle brakes 76. A brake pedal 78 operated by the driver controls the valve 72 to operate and release the air brakes.

In FIGURE 4, the bipartite air line valve 50 is shown in the valve-closed, undisplaced position. The pedal-connected inner piston 58 has an engine idling position corresponding to the released or idle position of the accelerator pedal, as shown by the broken lines 54b in FIGURE 3. The outer piston 60 is held in a position corresponding to low turbocharger speed and low manifold pressure, i.e., the connection 68 controlled by the spring 66 and diaphragm 62 is in an unmoved position relative to the valve 50. A pair of ports 78 in the wall of the outer piston 60 is partially in registry with stator ports in the valve 50, but the pair of ports 78 is blocked from intercommunication through a generally Z-shaped crossover passage 80 formed in the inner piston 58.

In FIGURE 3, the valve 50 has a displaced open valve condition corresponding to high vehicle acceleration or a high lugging situation such as negotiating a steep grade at low vehicle speed. In attaining this position, the outer piston 60 is displaced slightly farther inwardly and the inner piston 58 is displaced much farther inwardly due to depression of the pedal 54 to the wide open position. In this position, the wall ports 78 at the ends of the crossover passage 80 are each in registry both with a stator port leading to the line 30, and that end of the crossover passage 80. At the same time, the spring loaded valve 50 is unseated, compressed air is flowing through the fully open control valve 50 and thence through the jet 28 in the air compressor 12, and both the speed of the turbocharger shaft and the pressure in the intake manifold 38 are rising. Therefore, the engine 40 rapidly accelerates to a cruise condition, or at least to a speed equivalent to engine cruising speed.

In FIGURE 5, the cruising position of the valve 50 is shown. In attaining this valve-closed position compared to the undisplaced position of FIGURE 4, the outer piston part 60 is displaced even farther inwardly due to high pressure in the intake manifold 38. The inner valve piston 38 has a position of moderate advancement inwardly corresponding to a vehicle cruise position of the accelerator pedal indicated by the broken lines 54c in FIGURE 3. The outer piston part 60 blocks the stator ports of the air line 30 so as to prevent air from transferring through the crossover passage 80. There is no high rate of shaft acceleration, which is precluded because at cruise the compressor is already running at high shaft speed and with high output pressure and volume.

From the foregoing, the compressed air line 30 can be seen to constitute a motive fluid carrying line essential to augment the drive of the compressor blading and, whenever the action is required, the valve 50 connected in that line can be moved from the undisplaced position of FIGURE 4 so as to open the line. More specifically because it is connected by linkage which is variable with the position of the fuel control lever 56, and is also connected with the diaphragm 62 and spring 66 responsive to changes in either parameter of output pressure or speed of the turbocharger shaft, the valve 50 thus responds to a displacing force applied thereto, approximately in the undisplaced position, that increases coordinately with corresponding fuel rate increases and shaft speed decreases. The resulting emergency condition of high acceleration terminates when partial or full retraction of the control lever 56 occurs and when attainment of a high shaft speed occurs, or when either event occurs.

The novel operation which my invention thus provides comprises the steps of: continuing to flow, firstly, the products normally rotating the gas turbine rotor, on the occurrence of a condition requiring a high rate of acceleration; continuing to flow, secondly, uncombusted air normally supplied to the intake manifold by the compressor rotor; simultaneously applying uncombusted air under high pressure to the compressor rotor in directions both aiding rotation and augmenting the secondly named flow; and maintaining the application of the uncombusted air in such directions for the duration of the condition.

What is claimed is:

1. For use with an engine provided with a manipulateable fuel control member and a waste gas conduit, a turbocharger compressor connected to the engine and having blades for supplying supercharged air thereto through the compressor outlet, and a turbocharger turbine connected to the engine in gas receiving relation to the waste gas conduit for applying driving torque to the turbocharger compressor, the improvement comprising:
   augmenting means for applying driving torque to the compressor, comprising a nozzle in said compressor having an axis in line generally with the compressor outlet, said nozzle discharging an air jet in the general direction of said outlet and directly against the outer tip portions of the compressor blades;
   an air line connected to the nozzle for conducting compressed air thereto from a source; and
   a valve operably connected with the fuel control member and disposed in said line to control feeding of an air flow to the air jet in accordance with manipulation of said fuel control member.

2. For use with an engine provided with a fuel control and a waste gas conduit, a turbocharger compressor having blades rotatable for supplying supercharged air to the engine through the compressor outlet, and a turbocharger turbine connected to the engine in gas receiving relation to the waste gas conduit for applying driving torque to the turbocharger compressor;
   the combination with the fuel control and the compressor
   of augmenting means for applying driving torque to the compressor, comprising a nozzle in said compressor for discharging an air jet in the general direction of said outlet and directly against the tip portions of the compressor blades;
   an air line connected to the nozzle for conducting compressed air thereto from a source; and
   a valve in said line connected to the fuel control and operable thereby to open said line during a predetermined acceleration condition of the engine and turbocharger.

3. The invention of claim 2, in further combination with a vehicle equipped with a fuel control and compressor as aforesaid, and adapted to be driven by the engine, said vehicle being further equipped with air brakes;
  air compressing means having communication to the air brakes; and
  a reserve brake tank having a connection to said communication to afford a reserve supply of compressed air for operating the brakes;
  said brake tank constituting the source of compressed air to said air line.

4. The invention of claim 3;
  comprising an interposed valve in said connection to limit the minimum reserve pressure below which no further air is allowed to pass from the reserve tank into the turbocharger compressor.

5. The invention of claim 2;
  said valve comprising a multipart conditionable valve having a fuel-control-connected part operable in a path of movement to a valve-open position corresponding to wide open acceleration condition, said valve being conditioned for valve-open operation in the just described manner at or below a low pressure on the outlet side of the compressor.

6. The invention of claim 5;
  said multipart valve normally having an undisplaced valve-closed position and further comprising a pressure responsive part having a valve-open opening which, in response to the low outlet pressure on the output side of the compressor, is positioned along the path of the control-connected part at a point to register with a valve-open opening in the control-connected part when the position of the latter corresponds to the wide open acceleration condition described.

7. The invention of claim 6;
  said pressure responsive part of the valve being controlled by a diaphragm and a spring;
  said spring acting in a direction against the diaphragm; one face of said diaphragm being connected to, and displaced by, the compressor outlet pressure in the opposite direction until the displacing force is balanced by the spring.

8. In a turbocharging system for an automotive vehicle having a fuel control, the combination including:
  a turbocharger having a driven shaft carrying compressor blading and having a compressor outlet;
  a motive fluid carrying line for supplying fluid for driving the blading and including therein a control valve displaceable to open the line;
  means variable with the position of said fuel control;
  means responsive to changes in speed of said driven shaft; and
  means controlled by the aforesaid two means and connected for imparting a displacement to said valve that varies coordinately with corresponding changes in position of the fuel control and with the speed of the driven shaft.

9. The invention of claim 8, the three said means being constructed and arranged whereby the valve displacement to valve-open position increases with increased fuel control setting and decreased speed of the driven shaft.

10. The invention of claim 9;
  said means responsive to changes in the speed of the shaft comprising a diaphragm and a spring, said spring acting in a direction against the diaphragm;
  said diaphragm being subjected to the compressor outlet pressure and displaced in the opposite direction thereby until the displacing force is balanced by the spring.

11. The invention of claim 10, further including:
  a nozzle in the turbocharger connected onto one end of said line, said nozzle discharging a compressor accelerating air jet in the general direction of said outlet and directly against tip portions of the compressor blading.

12. The invention of claim 11, in combination with said automotive vehicle;
  said vehicle having an air brake system comprising:
    a set of air brakes; and
    a reserve brake tank providing a reserve supply of air for braking and connected onto the end of the motive fluid line opposite to the nozzle connected end thereof.

References Cited
UNITED STATES PATENTS

| | | | |
|---|---|---|---|
| 2,489,540 | 11/1949 | Priess | 123—119 |
| 2,731,792 | 1/1956 | Nallinger | 60—13 |
| 3,091,077 | 5/1963 | Erickson | 123—119 |
| 3,190,068 | 6/1965 | Williams | 60—13 |

CARLTON R. CROYLE, *Primary Examiner.*

MARK M. NEWMAN, *Examiner.*

D. HART, *Assistant Examiner.*